UNITED STATES PATENT OFFICE.

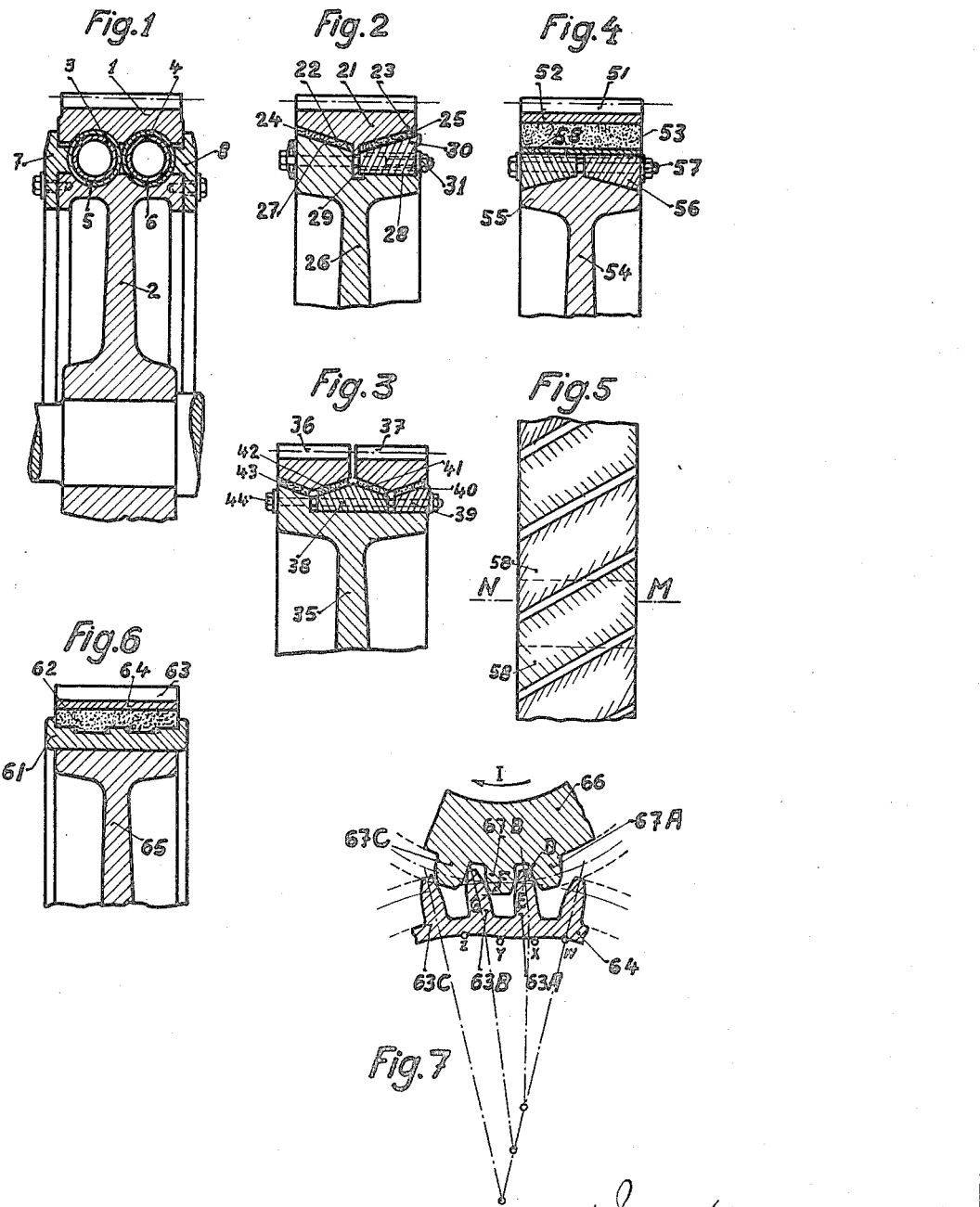

HULDREICH KELLER, DECEASED, BY KATHARINA KELLER, ADMINISTRATRIX, OF ZURICH, SWITZERLAND, ASSIGNOR TO THE FIRM AKTIENGESELLSCHAFT DER MASCHINENFABRIKEN ESCHER WYSS & CIE., OF ZURICH, SWITZERLAND.

GEAR WHEEL.

1,424,203. Specification of Letters Patent. Patented Aug. 1, 1922.

Application filed November 4, 1920. Serial No. 421,780.

*To all whom it may concern:*

Be it known that I, KATHARINA KELLER, née HAUSAMMANN, a citizen of the Republic of Switzerland, residing at Zurich, Switzerland, administratrix of the estate of HULDREICH KELLER, late a citizen of the Republic of Switzerland, deceased, who has invented certain new and useful Improvements in Gear Wheels, do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

The invention relates to improvements in gear wheels and more particularly to composite gear wheels. Gear wheels should respond to the following requirements: to run smoothly and noiselessly, to have a long life, to be very little influenced by faults in the toothing, to be simply and cheaply manufactured and to be easily exchangeable. These various conditions are fulfilled by the object of the present invention. According to it an intermediate ring is interposed between the toothed rim proper and the wheel disc which ring consists of a material that is soft and elastic in comparison to metal and it exerts such a pressure in the radial direction that the friction between the inserted ring and the toothed rim on one side and between said ring and the wheel disc on the other side is sufficient for power transmitting purposes. As material for the inserted ring rubber, leather and the like may be used. A special exemplification of the invention shows the inserted ring being made of a hollow ring filled with compressed air and a cover of a tyre surrounding said hollow ring or air tube, which cover is divided in the longitudinal direction along the circumference, whereby the cover bridges over the gaps between the toothed rim and the wheel disc and transmits by far the greatest part of the energy between disc and rim. The inserted ring and the pressure faces co-acting with the latter and provided at the rim and at the wheel disc may be in the main of a conical or a cylindrical shape. In order to produce the necessary radial pressure an axially adjustable metallic tightening ring may be used which is confined in at least one radial direction by a conical surface. In this case the inserted ring may be covered on its surface adjacent to the tightening ring with metallic segments the adjacent edges of which are cut obliquely to the direction of the circumference. The teeth may be arranged on a metallic solid ring the radial thickness of which is considerably smaller than the thickness of teeth at their root so that the ring deflects locally from the cylindrical shape into an S shape upon the action of the tooth pressure. The deflection of the toothed rim causes a deflection of the tooth that is in engagement at the time being. It is of importance that the driven tooth deflects more than the driving tooth with a given power transmitted. This deflection may be increased besides providing a thin toothed rim by increasing the height of the driven tooth by one third and by thinning it by one fourth of the corresponding dimensions of the driving tooth or by using said two means at the same time. The toothed rim mounted on the wheel disc may be subdivided at least once in the axial direction.

The various parts may be dimensioned such that a very large circumferential power may be transmitted without any slip taking place. But the toothed rim may move relatively to the wheel disc by a certain amount whereby the radial fibres of the inserted ring or rings may deflect by a small amount. If the toothing shows faults in the pitch, the toothed rim may lead or lag relatively to the wheel disc without the wheel disc and masses rigidly connected to the latter being affected by the variation of the angular speed resulting from the faculty toothing in the rim of a rigid wheel.

Wheels constructed in this manner are especially adapted for the working in parallel of two pairs of toothed wheels. Even if one pair is not adjusted very exactly relatively to the other, the momentary power to be transmitted will yet be nearly equally divided between the two pairs of wheels, because the toothed rim of the one pair may be twisted relatively to the shaft or to the other toothed rim respectively by such an amount that both rims take up or deliver approximately the same power. Another advantage of this construction consists in the fact, that the inserted rings damp the noise on account of the soft and elastic material of which they are made. Such wheels can therefore be used with a much higher circumferential speed and a much larger circumferential power than rigid metal wheels and can therefore transmit much larger energies.

The invention may be used with spur gear wheels as well as with helical toothed wheels, toothed racks and worm gears.

Several modes of carrying the invention into effect are shown in the accompanying drawings.

Fig. 1 is a radial section through one constructional form of a resilient wheel;

Fig. 2, shows a second constructional example in a radial section;

Fig. 3, is a radial section through a third constructional example;

Fig. 4, is a radial section through a fourth constructional example;

Fig. 5, is a plan view of a detail of Fig. 4;

Fig. 6 is a radial section through a fifth constructional example;

Fig. 7 is a section at right angles to the axis through the rim of the wheel illustrated in Fig. 6 and of a co-operating wheel on a larger scale.

Fig. 1 shows a radial section through one half of a composite wheel, the toothed rim 1 is operatively connected to the wheel disc 2 by means of two air tubes, which are similar to those used with tyred vehicles. The toothed rim 1 is provided on its inner face with two grooves of approximately semi-circular cross-section and the wheel disc 2 with similar grooves on its outer face. An annular gap exists between the rim 1 and the disc 2 through which an air-tight tube each (3 and 4) and a cover each (5 and 6) which is made in halves can be introduced. The lateral gaps between rim 1 and disc 2 are closed by means of covering rings 7 and 8 which are screwed to the disc 2. Then the air tubes 3 and 4 are inflated in a manner known with automobiles. In this way a pressure acting in all directions of for instance 4-5 kg/cm² may be produced within the air tubes 3 and 4. The covers 5 and 6 are pressed with approximately the same specific pressure against the grooves provided in the rim 1 and in the disc 2. The joints of each of the covers 5 and 6 are disposed in planes parallel to the plane of the wheel, so that the halves of the covers 5 and 6 bridge over the gaps existing between the rim 1 and the disc 2 and are in a position to transmit the greatest part of the power between rim and disc. This power may be transmitted either from the rim to the disc or from the disc to the rim according to the wheel being driven or driving. In case the rim 1 has the tendency to twist through a large angle relatively to disc 2, it would have to overcome the frictional resistance produced by the above mentioned specific pressure. This frictional resistance is very considerable because the frictional pressure between the tyres 5 and 6 on one side and the wheel disc 2 on the other side is very great.

In the exemplification illustrated in Fig. 2 the toothed rim 21 is confined on its inner side by two conical faces 22 and 23 sloping towards each other, which are covered by two conical rubber plates 24 and 25. The wheel disc 26 of which only part of a radial section is shown is confined at its outside in the left half thereof by a conical face 27 and in the right half by a cylindrical face 28. Between said two faces a groove 29 is provided. Upon the cylindrical face 28 a tightening ring 30, which is of a trapezoid cross-section and is split in at least one point of its circumference, may be displaced in the axial direction by means of screw bolts 31, whereby a pressure between the rim 21 and the disc 26 is produced which acts in a radial direction. The rubber plates 24 and 25 inserted between said faces produced the necessary frictional force whilst providing for the desired resiliency between rim and disc.

Fig. 3 illustrates two toothed rims 36 and 37 arranged on one wheel 35. These rims are connected to the wheel disc 35 by means of two metallic rings 38 and 39, defined at their outside by conical faces, and rubber plates 40, 41, 42 and 43 and bolt 44.

In the constructional example shown in Fig. 4 the teeth 51 are arranged on a cylindrical ring 52. At the inner side of the latter a rubber ring 53 of cylindrical shape is provided. The outer faces of the wheel disc 54 are shown sloping towards the two lateral sides of the wheel. Two tightening rings 55 and 56 bear against said faces, their inner faces being arranged conically and their outer faces cylindrically. When the tightening rings are moved toward each other by the aid of the screw bolts 57, they are also displaced in the radial direction and exert thereby a radial pressure on the rubber ring 53, which is transmitted by the latter to the toothed rim 52. In order to facilitate a sliding of the rings 55 and 56 in the axial direction, the inner face of the rubber ring 53 is covered by metallic plates 58 of a cylindrical shape, the adjacent edges of which are cut in an oblique direction with regard to the circumferential direction. Some of these metallic plates 58 are illustrated in Fig. 5 whereby it is assumed that these plates are developed from the cylindrical shape into the plane of the drawing. Fig. 4 is a section along line N—M of Fig. 5 through the metallic plates 58. To prevent a sliding of said plates in the direction of the circumference on the conical rings 55 and 56 they may be secured by tongues and grooves.

Fig. 6 is an illustration of a wheel in which all the parts fitted to each other are of cylindrical shape. Upon a base ring 61 of comparatively great radial thickness a rubber ring 62 is cast as is done for example when manufacturing solid tyres for lorries. Onto the rubber ring 62 the toothed rim is shrunk. The latter consists of teeth 63 and a comparatively thin metallic ring 64. The rings 61, 62 and 64 joined together in the above described manner form one ring which is pressed on the wheel disc 65 for instance by the aid of a hydraulic press. The toothed rim 63, 64 is illustrated in a vertical central section on a larger scale in Fig. 7 and it is shown at the same time in engagement with the teeth 67 of a driving wheel 66. According to Fig. 7 the teeth $63^A$, $63^B$ and $63^C$ of the driven wheel are nearly half as high again and are at the root thinner by one third as compared with the teeth $67^A$, $67^B$ and $67^C$ of the driving wheel 66. The latter, which rotates in the direction of arrow I is to be considered as rigid in view of its comparatively short and stout teeth 67 as compared with the toothed rim of the driven wheel. The teeth 63 of the driven wheel, however, can be deflected in the direction of the circumferential force, i. e. towards the left, on account of their comparatively great height and their comparatively narrow root. Moreover said circumferential force effects on account of the great leverage a deflection of the thin toothed ring 64 from its cylindrical shape into an S like shape $w$—$x$—$y$—$z$, so that the teeth of the driven wheel, which are in engagement at the moment are deflected still further out of their initial unloaded position in the direction of the circumferential force. The greatest deflection occurs with that one of the driven teeth which has just come into engagement, i. e. the tooth $63^A$. At this moment the corresponding driving tooth $67^A$ contacts at a point near its root, i. e. point D, with the tip E of the driven tooth $63^A$ and thereby causes the greatest bending moment. The point of contact glides during the working of the teeth towards the root of the driven tooth up to the point G, the leverage becomes smaller and thereby the bending moment acting upon the driven tooth is decreasing. Towards the end of the engagement the driven tooth is able to straighten itself again. At this moment the driving tooth which meanwhile has come into the position $67^B$ shown in the drawing is loaded at its tip F but it does not deflect appreciably because the tooth is built comparatively strongly and forms part of a rigid wheel body. With regard to their strength and deflection the teeth may be considered as beams rigidly fixed at one end. Their deflection with regard to a force acting at the other end is in direct proportion to the third power of their length and in indirect proportion to the third power of their thickness. If, therefore, the driven tooth is by at least one third higher than the driving tooth its deflection assuming the other dimensions and the acting force to be the same, is at least $(\frac{4}{3})^3$ i. e. at least 2, 3 times as great as that of the driving tooth. If the thickness of the driven tooth is by at least $\frac{1}{5}$ smaller than that of the driving tooth its deflection, the other circumstances being equal, is at least $(\frac{5}{4})^3$ i. e. at least 1, 8 times greater. If, now, the driven tooth is made by at least one third higher and at the same time and at the same distance from the tip of the tooth by at least one fifth thinner than the driving tooth, the former will deflect at least $2\frac{1}{3} \times 1\frac{8}{10}$ i. e. at least $4\frac{1}{5}$ times as much as the driving tooth. In reality the gain in the adaptability to deflect is still greater as the shape of the thinned driven tooth corresponds closer to a body of uniform strength than the stout driving tooth. The consequence of the afore-mentioned constructions is a very smooth working of new teeth whereby noise, vibrations and stresses by shocks resulting from small faults in the pitch are reduced to the smallest amount.

I claim:

1. A composite wheel, in combination, a toothed rim, a metallic ring, a ring consisting of a soft, elastic material inserted between said rim and said metallic ring, said three parts forming one composite ring the parts of which being secured to each other by radially acting shrinkage stresses, and a wheel body onto which said composite ring is pressed.

2. A composite wheel, in combination, a toothed rim, the solid rim of which is dimensioned in the radial direction considerably smaller than the thickness of the teeth at their root so that the action of the tooth pressure causes a local deflection of said solid rim from the cylindrical shape into an S shape, a wheel body and a ring consisting of a soft, elastic material inserted between said rim and said wheel body and uniting said parts by a pressure acting in radial directions.

3. In combination a driving gear wheel and a driven gear wheel, said driving wheel comprising a toothed rim, the teeth of which are at least one third higher than the teeth of the driving wheel, a wheel body and a ring of soft, elastic material interposed between said rim and wheel body and said rim, ring and wheel body united by radial pressure.

4. In combination a driving gear wheel and a driven gear wheel, said driven gear wheel comprising a toothed rim, the roots of the teeth of which are at least one fourth thinner than the roots of the teeth of the driving wheel, a wheel body, and a ring of soft, elastic material interposed between said rim and body, said ring, rim and body united by radial pressure.

5. A gear wheel having a body portion yielding cushion and a toothed rim, said cushion interposed between rim and body and said rim being flexible, the teeth of which are both thinner and longer than the wheel with which it is intended to mesh.

In testimony that I claim the foregoing as the invention, of the said HULDREICH KELLER, I have signed my name.

KATHARINA KELLER,
*Administratrix of Huldreich Keller, deceased.*